2,779,688

METHOD OF GLASS COLORATION AND ARTICLE PRODUCED THEREBY

Martin E. Nordberg, Corning, N. Y., assignor to Corning Glass Works, Corning, N. Y., a corporation of New York No Drawing. Application December 28, 1953, Serial No. 400,799

6 Claims. (Cl. 117—63)

This invention relates to the coloration of high-silica glasses in accordance with the teaching disclosed in Patent No. 2,303,756 to Harold E. Rumenapp and myself and is particularly concerned with improvement of the uniformity of such coloration with a substantial saving in time and the elimination of undesirable stresses in such colored glasses.

According to such patent, a colored article composed of a glass containing over 93% $SiO_2$ can be produced by melting and shaping a particular easily meltable glass of lower silica content and extracting therefrom soluble, non-siliceous constituents by leaching in dilute acid to leave a highly siliceous structure retaining its original shape and having a multiplicity of intercommunicating submicroscopic pores, which porous glass can be impregnated with a solution of an inorganic glass-coloring agent, for example, a metal salt or other metal compound, and thereafter dried and heated without fusion to close the pores and incorporate the glass-coloring agent therewithin.

In carrying out such process, it has been found that a redistribution of the metal salt or other compound in the impregnated porous glass article occurs during drying and a small proportion of the salt in the pores diffuses towards the surface of the glass article. As a result of such diffusion the concentration of the resulting coloring oxide in the impregnated glass article after firing is somewhat higher at its surface than in its interior. Moreover, wherever the surface of the article is shielded or otherwise prevented from drying freely, as for example, where the supporting means comes into contact or into close proximity with the surface of the impregnated glass during drying, the concentration of the glass-coloring oxide is considerably less than in adjacent portions of the surface which are not so shielded.

Such uneven distribution of the coloring oxide causes non-uniformities not only in coloration but also in the thermal expansion-coefficient of such a glass article, the color being more saturated and the expansion coefficient being higher wherever the concentration of the coloring oxide is greater. The resulting generally higher expansion coefficient at the surface of the article causes a surface tensional stress which tends to lower the mechanical strength of the article. Lateral variations in the expansion coefficient caused by such uneven drying comprise an added source of weakness.

Moreover, a non-uniformity of coloration of such a glass article also results from unavoidable variations in the thickness of the ware caused by uneven distribution of the glass in blown articles or by differences in thickness of pressed ware having a pattern or design. In the practice of the above procedure, the porous glass article is impregnated throughout its thickness with the glass-coloring agent and the thicker portions consequently contain more of the coloring agent and appear a darker shade of color than the thinner portions.

I have now discovered that such difficulties can be overcome and other advantages unexpectedly can be obtained by restricting the absorption of the glass-coloring agent during impregnation to a relatively thin layer of the porous glass article inwardly removed from its surface. More specifically, my invention comprises contacting an area of the surface of the article with a solution of the inorganic glass-coloring agent to absorb the solution into the pores of such area and impregnate a layer therewith while leaving the pores farther in from the surface unimpregnated, ceasing impregnation with such solution, immediately thereafter continuing impregnation of the article with a volatile liquid such as water until the solution in such layer has been moved by capillary action farther into the glass, and then drying the article and firing without fusion to close the pores and incorporate the glass-coloring agent within the glass.

Instead of being impregnated throughout with the glass-coloring agent, the porous glass article, according to the present method, is impregnated therewith only in a thin layer spaced inwardly from its surface. Such colored impregnated layer lies between a clear or uncolored impregnated layer at the surface and the unimpregnated central portion of the article. The provision of a layer at the surface of the porous glass article containing only a volatile liquid or solvent such as water and forming a boundary of the internal layer containing the solution of the glass-coloring agent prevents diffusion of the glass-coloring agent to the surface of the article during drying and avoids uneven distribution thereof at its surface.

To concentrate the glass-coloring agent in a thin layer of the porous glass article requires the use of a solution more concentrated than heretofore. The impregnation of porous glass articles by this new method to produce a desired shade of color is thus greatly accelerated and requires only a few seconds or minutes.

Such selective impregnation of the porous glass article depends upon capillary action, and it is essential that the porous glass be substantially dry or that its pores be substantially empty before impregnation is begun. When impregnation with the glass-coloring agent solution has proceeded to the desired depth, the impregnated porous glass is removed from contact with the glass-coloring agent solution and the glass is immediately transferred and immersed in a volatile liquid such as water or the solvent of the impregnating solution. Any substantial delay in such transfer may result in non-uniform coloration caused by the continuing and uneven absorption of the excess solution clinging to the surface of the glass before it can be washed off.

The thickness of the colored impregnated layer and the time required for its impregnation depend upon the shade desired and the concentration of the impregnating solution, the concentration being desirably high in order to keep at a minimum the amount of liquid to be subsequently evaporated and to maintain ample reserve porosity in the central portion of the article for the subsequent absorption of the volatile liquid or solvent into its surface. On account of the rapidity of such absorption the shortest possible immersion is beneficial. The optimum effect, however, requires about one minute. Beyond this little or no benefit is to be derived and more than two minutes tends to increase the thickness of the surface layer objectionably.

When the porous glass article, impregnated as described, has been dried and fired to close its pores and consolidates the glass, the glass-coloring agent is converted to the corresponding oxide which colors the glass in the usual manner. The thickness of the colored layer resulting from such coloring oxide according to the present method is surprisingly uniform, and the color of the finished article as a whole is equally uniform regardless of variations in the thickness of the article. An article made by the present method has a compressional stress instead of a tensional stress in its surface, which increases its mechanical strength because its uncolored surface layer has a lower expansion coefficient than its colored layer.

The present method is particularly useful for the production of a low-expansion, heat-resistant, infrared-transmitting glass plate to be utilized as a cooking surface over a high-wattage, incandescent heat lamp. Such a plate, composed of over 93% $SiO_2$ and having an expansion coefficient of about $8 \times 10^{-7}$ per °C., desirably has a transmission of 50% or more for infrared radiations and a transmission of less than 5% for visible radiations. Its visible color is a very deep shade of red, and it is made by impregnating a plate of the above porous glass about 4 mm. thick by immersing it for about 60 seconds in an aqueous solution consisting of 150 gm. $Fe_2(NO_3)_3 \cdot 9H_2O$, 150 gm. $Ni(NO_3)_2 \cdot 6H_2O$, 150 gm. $Al_2(NO_3)_3 \cdot 9H_2O$, 100 cc. $HNO_3$ (1.42 Bé.) and water sufficient to make one liter of solution. The impregnated plate is transferred and immersed in pure water for about 60 seconds, from which it is then removed and dried in a chamber heated at 60–80° C. and subsequently fired without fusion to close the pores and consolidate the glass.

When colored throughout with such coloring agents by the method according to Patent No. 2,303,756, not only does such plate have a variable tensional stress in its surface and a non-uniform color due to diffusion of coloring oxides during drying but the ratio of infrared transmission to visible transmission is not as high as is desired. When the same amount of color is concentrated in a relatively thin internal layer of the glass article by impregnating the porous glass according to the present method with a more concentrated solution of the coloring agent, the ratio of the infrared transmission to the visible transmission of the glass is unexpectedly and substantially increased. The reason for this is not known.

I claim:

1. In the method of coloring an article composed of a glass containing over 93% $SiO_2$ and having throughout its mass a multiplicity of substantially empty, submicroscopic intercommunicating pores by impregnating the pores with a solution of an inorganic glass-coloring agent and thereafter drying and heating the article without fusion to close the pores and incorporate the glass-coloring agent into the glass, the steps of impregnating the pores only at and near the surface of the glass while leaving the pores farther in from the surface unimpregnated and thereafter immediately continuing the impregnation with only the solvent until the solution in the impregnated pores has been moved by capillary action farther into the glass.

2. The method of claim 1 in which the article is completely immersed during impregnation.

3. The method of claim 1 in which the solvent is water.

4. The method of claim 3 in which the inorganic glass-coloring agent is a mixture containing a water soluble iron salt and a water soluble nickel salt.

5. A colored glass article composed of a glass containing over 93% $SiO_2$ and an inorganic glass-coloring agent, the glass-coloring agent being contained solely in a uniformly thin layer of the glass spaced inwardly from the surface of the article, the colored layer having been formed by the method of claim 1.

6. The colored glass article defined in claim 5 in which the glass-coloring agent consists of an oxide of iron and an oxide of nickel and the glass has transmissions of at least 50% for infrared radiations and less than 5% for visible radiations.

References Cited in the file of this patent

UNITED STATES PATENTS

| | | |
|---|---|---|
| 1,353,599 | Lovell | Sept. 21, 1920 |
| 2,355,746 | Nordberg et al. | Aug. 15, 1944 |
| 2,522,524 | Lukes | Sept. 19, 1950 |
| 2,582,919 | Biefeld | Jan. 15, 1952 |